Nov. 23, 1943.   T. BROWN   2,334,862
POWER LIFT
Original Filed Jan. 31, 1941   4 Sheets-Sheet 1

Nov. 23, 1943.  T. BROWN  2,334,862
POWER LIFT
Original Filed Jan. 31, 1941  4 Sheets-Sheet 2
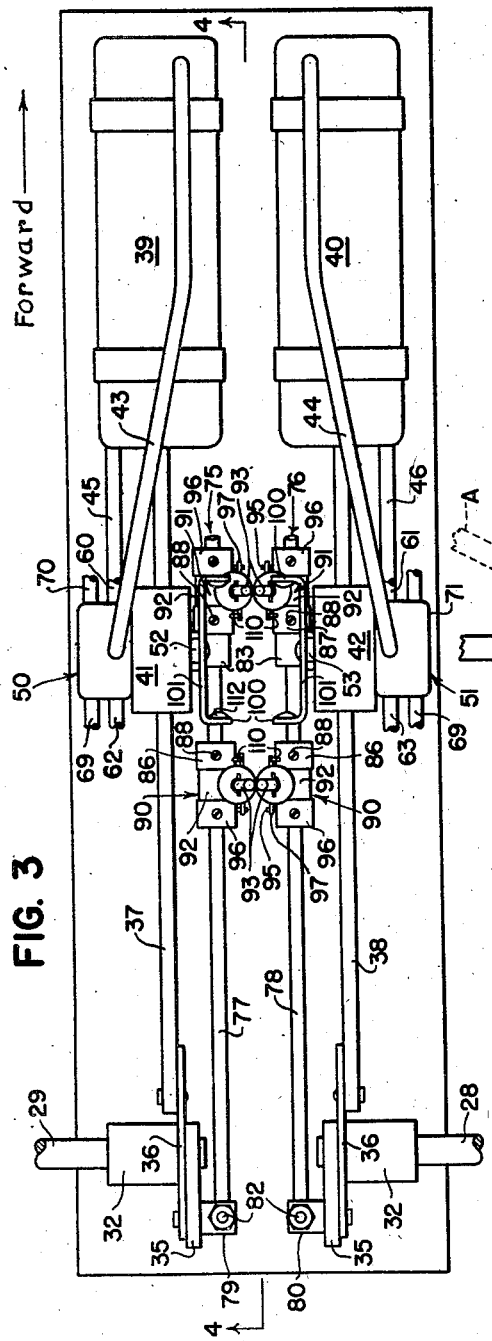
FIG. 3
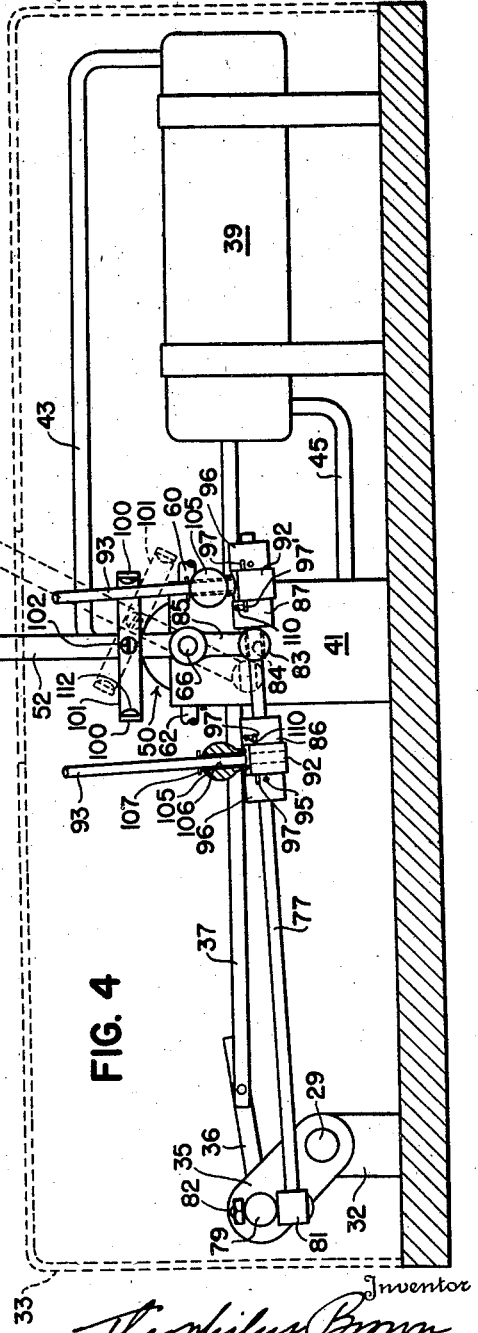
FIG. 4
Inventor
Theophilus Brown
Attorneys Nov. 23, 1943.                T. BROWN                    2,334,862
                              POWER LIFT
            Original Filed Jan. 31, 1941       4 Sheets-Sheet 3
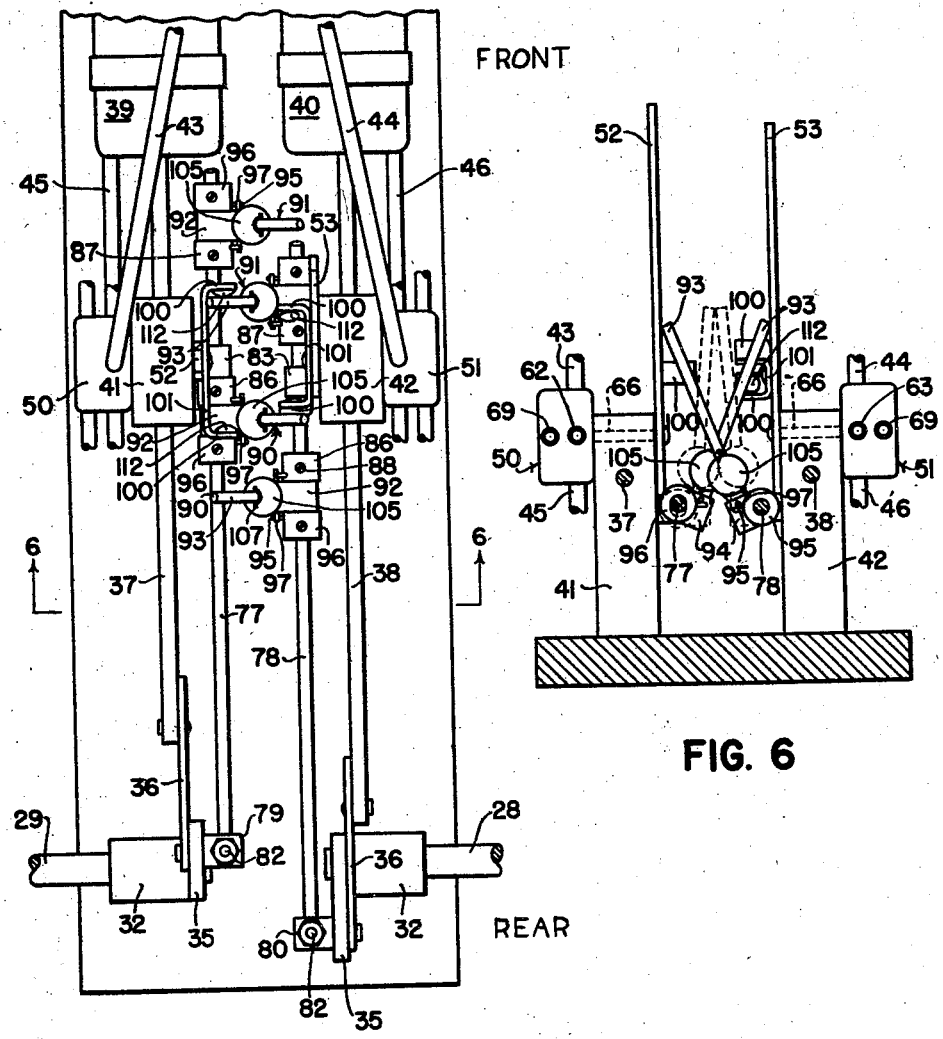
FIG. 5
FIG. 6

Nov. 23, 1943.  T. BROWN  2,334,862
POWER LIFT
Original Filed Jan. 31, 1941  4 Sheets—Sheet 4

Inventor
Theophilus Brown
By [signature]
Attorneys

Patented Nov. 23, 1943

2,334,862

UNITED STATES PATENT OFFICE 2,334,862

POWER LIFT

Theophilus Brown, Moline, Ill., assignor to Deere & Company, Moline, Ill., a corporation of Illinois Continuation of application Serial No. 376,808, January 31, 1941. This application November 29, 1941, Serial No. 420,907

22 Claims. (Cl. 97—50)

The present invention relates generally to control mechanism and more particularly to power lift control mechanism, such as, for example, the mechanism associated with tractors or the like, for actuating implements associated therewith, and is a continuation of application, Serial No. 376,808, filed January 31, 1941. More specifically, my invention relates to that type of power lift mechanism which includes a pair of independently movable members actuated by power from the engine of the tractor.

The principal object of my invention relates to the provision of control means for the independently operable members, by which a movement of either of the members in either direction will effect a successive movement of the other of the members in the same direction.

One application of this mechanism is in connection with tractor mounted implements such as cultivators or planters mounted on opposite sides of the tractor body and thus providing for cultivating or planting a plurality of rows of crops. Whenever the crop rows terminate along a line disposed at an acute angle thereto, which occurs in contour farming and in irregularly shaped fields, it is desirable to raise the implements at one side of the tractor before the implements at the other side of the tractor are raised, and similarly to lower the implements in succession. In my Patent No. Re. 21,667, reissued December 24, 1940, I disclosed a power lift mechanism in which the implements at two spaced positions on the tractor can be lifted successively, but in that case the implements were always lifted in the same sequence. This does not fully meet the requirements of contour farming, however, for the acute angle between the line of termination of the crop rows and the line of advance of the tractor is just as likely to be on one side of the tractor as on the other. According to the present invention, the operator has the choice of raising the implements on either side of the tractor by actuating the corresponding control element, and the implements on the other side of the tractor are then raised responsive to the movement of the first set of implements to raised position. Similarly, either set of implements may be then lowered, and the other set of implements will follow to lowered position after a predetermined interval.

These and other objects and advantages of my invention will be apparent to those skilled in the art after a consideration of the following description, in which reference is had to the drawings appended hereto, in which Figure 1 is a plan view of a tractor and a set of cultivating tools mounted on each side of the tractor and independently raised and lowered according to the principles of the present invention;

Figure 3 is a plan view of a hydraulic power lift mechanism embodying the principles of the present invention, the forward end of the mechanism, as disposed on the tractor, being toward the right;

Figure 4 is a side elevational view of the power lift mechanism taken in section along the line 4—4 in Figure 3;

Figure 5 is a plan view of the power lift mechanism as viewed from the rear of the tractor, shown in a position in which one of the lifting members is in lifted position and has just set the control element of the other lifting member into lifted position;

Figure 6 is a sectional elevational view taken along a line 6—6 in Figure 5;

Figure 1:
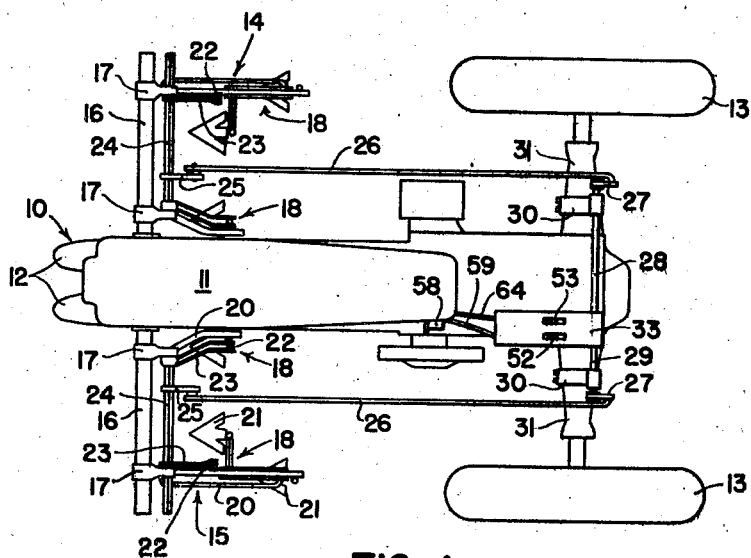
Figure 2:
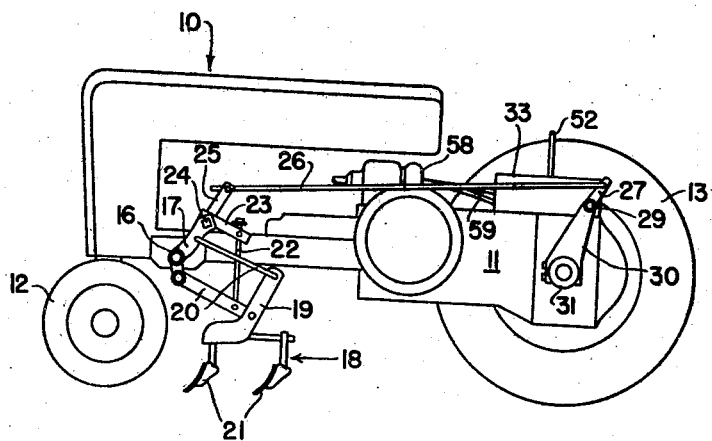
Figure 2 is a side elevational view of the tractor and implements mounted thereon.

Referring now to the drawings, the tractor 10 comprises the usual longitudinally extending body 11 supported on a pair of closely spaced dirigible front wheels 12 and on a pair of laterally spaced rear traction wheels 13. Mounted on opposite sides of the tractor body 11 are a pair of cultivating implements, indicated generally by reference numerals 14, 15, respectively. Each of the implements comprises a laterally extending supporting beam 16, rigidly mounted on the side of the tractor body 11 adjacent the front wheel 12. Each of the beams 16 carries a pair of laterally spaced brackets 17, having portions extending above and below the transverse beams 16. Mounted on each of the brackets 17 is a cultivator rig 18 including a rig beam or frame 19 connected to the associated bracket 17 by a pair of substantially parallel links 20, and thus providing for vertical movement of the cultivator rigs relative to the supporting beam 16. Each rig beam 19 supports one or more cultivating tools 21 in the usual manner. Each of the cultivator rigs 18 is raised through a tie rod 22 suspended from an arm 23 fixed to a rock shaft 24, journaled at opposite ends in the laterally spaced brackets 17 on the associated supporting beam 16. The rock shaft is rocked by means of an arm 25 fixed intermediate the ends of the rock shaft. The arm 25 is actuated by means of a rod 26 pivotally connected to the arm 25 at its forward end and extending rearwardly alongside the tractor body 11 to the rear of the tractor. The rear ends of the two actuating rods 26 are swingably connected to a pair of arms 27 fixed on the outer ends of a pair of coaxially disposed rock shafts 28, 29, supported adjacent their outer ends on bearing brackets 30, which are mounted on the usual implement supporting bosses on the tractor axle housings 31. The inner ends of the two rock shafts 28, 29 are journaled in bearing blocks 32 (see Figures 3 and 4), which are disposed within a housing 33 containing the power lift actuating mechanism, which will now be described in detail.

The rock shafts 28, 29 extend inwardly of the bearing blocks 32 and are rigidly fixed to a pair of crank arms 35, which are connected by links 36 to the ends of a pair of piston rods 37, 38, extending rearwardly from a pair of hydraulic cylinders 39, 40, respectively. The piston rods 37, 38 are slidably supported in a pair of bearing blocks 41, 42, respectively, and are connected at their forward ends to suitable pistons (not shown) within the cylinders 39, 40, respectively. The pistons are moved axially in the cylinders in either direction selectively, by introducing suitable fluid, such as oil, under pressure to either end of the cylinder.

It will now be evident from the drawings that when fluid is admitted under pressure to the rear ends of the cylinders through cylinder input ducts 45, 46, respectively, the pistons are forced forwardly in the cylinders 39, 40 and acting through the piston rods 37, 38, links 36 and arms 35, the rock shafts 28, 29 are rocked to force the rods 26 forwardly and thus rocking the rock shafts 24 to lift the elevator rigs 18 through the suspension rods 22, and the cultivator rigs are lowered by allowing the oil to flow out of the cylinders 39, 40 through the oil ducts 45, 46 and at the same time, pumping oil under pressure into the forward ends of the cylinders 39, 40, through ducts 43, 44, respectively, thereby forcing the piston rods 37, 38 and side rods 26 rearwardly to exert a downward pressure upon the cultivator rigs and thus forcing them to any desired operating depth in the ground.

Figure 7:
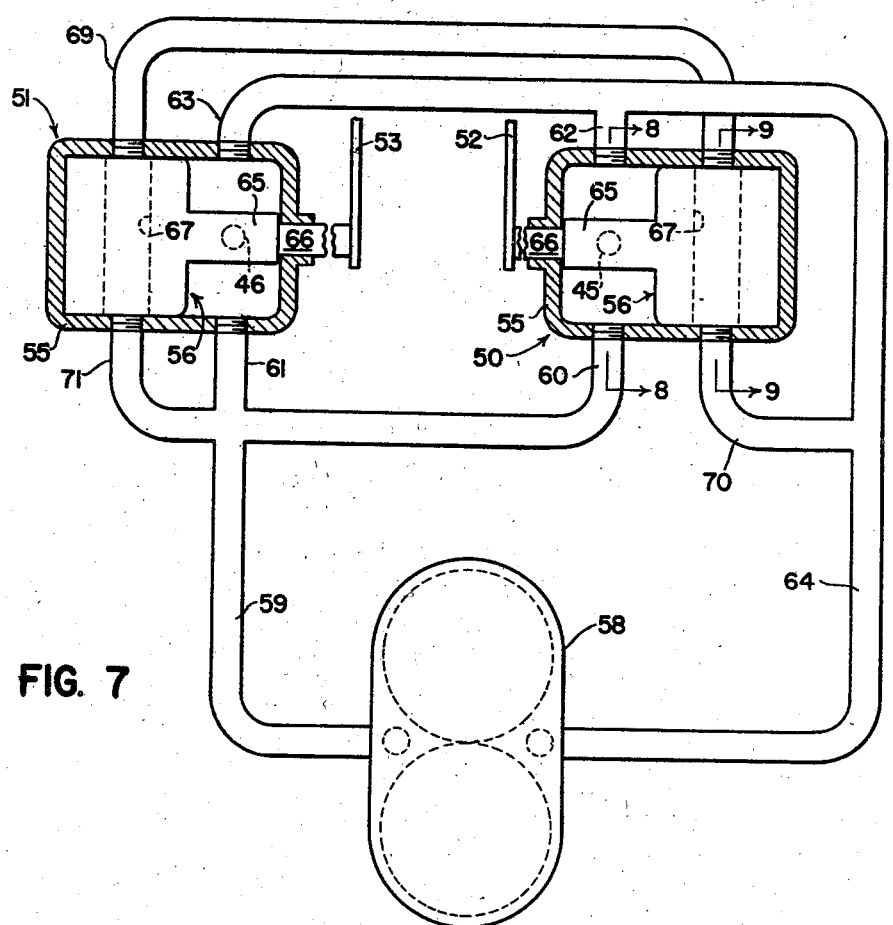
Figure 7 is a diagrammatic lay-out of the hydraulic control valves showing their connections with the pump.

Each of the cylinders 39, 40 is provided with an individual control element for controlling the direction of flow of the operating fluid in the ducts and thus controlling the movement of the piston in the cylinder. The control elements comprise a pair of control valves 50, 51 mounted on the supporting blocks 41, 42, each of the valves having a control lever 52, 53, respectively. In Figures 3 and 4 the hydraulic duct connections are broken away to simplify the disclosure of the mechanical control elements, but in Figure 7 is shown a diagram of the complete hydraulic connections. Each of the valves 50, 51 includes a cylindrical housing 55, within which is disposed a rotatable valve element 56, which fits closely within the valve housing 55.

The oil is forced under pressure from a pump 58 of any conventional design, preferably a gear pump as indicated, suitably connected to the tractor engine, as through the governor shaft, to be driven thereby. The oil is supplied under pressure through a main supply duct 59 to a pair of branch ducts 60, 61, communicating with the valve housings 55 adjacent one end thereof. A pair of branch ducts 62, 63 are connected in communication with the valve housings, respectively, at ports diametrically opposite those of the input ducts 60, 61. The branch ducts 62, 63 are connected to a common return duct 64 leading to the low pressure side of the gear pump 58.

Figures 8, 9:
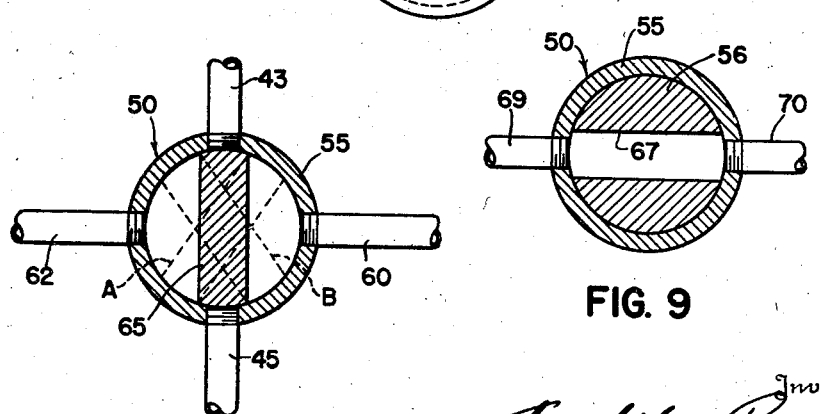
Figure 8 is a sectional view through one of the valves taken along a line 8—8 in Figure 7.
Figure 9 is a sectional view taken along a line 9—9 in Figure 7.

The ducts 43, 45 from the front and rear ends of the cylinder 39 are connected in communication with the valve housing 55 of the valve 50 at the top and bottom, respectively, and spaced substantially 90 degrees from the ducts 60, 62, as indicated in Figure 8. The portion of the rotatable valve member 56 in register with the ducts 43, 45, 60 and 62 is in the form of a wall 65 having arcuate ends disposed in sliding contact with the interior of the valve housing 55 and having a sufficient thickness to cover and close off the ports at opposite sides of the housing 55 and at the top and bottom thereof. When the valve portion 65 is disposed vertically, as indicated in Figure 8, the ducts 43, 45 are closed off, thereby locking the piston hydraulically within the cylinder 39, so that it cannot move in either direction therein. The valve members 56 can be rotated within the housings 55 by means of the control levers 52, 53, respectively, which are connected thereto by means of axially disposed shafts 66 journaled in the housings 55. The shafts 66 extend through the supporting blocks 41. By inclining the control lever 52 forwardly (or to the right in Figure 4), to the position marked "A," the valve portion 65 is moved angularly to the corresponding position "A," indicated in Figure 8 in dotted lines, in which the high pressure duct 60 is connected in communication with the duct 45 leading to the rear end of the cylinder 39, while the cylinder duct 43 leading to the forward end of the cylinder 39 is connected with the return duct 62, 64. This causes the piston to move forwardly in the cylinder and results in the actuating rod 26 on the left side of the tractor being moved forwardly to raise the left hand cultivator shovels 21. Conversely when the control lever 52 is moved through an equal angle rearwardly from the vertical position, the valve portion 65 is moved to position "B" indicated in dotted lines in Figure 8 in which the high pressure supply duct 60 is connected with the duct 43 leading to the forward end of the cylinder, and the return duct 64 is connected through the branch 62 to the cylinder duct 45 leading to the rear end of the cylinder 39. Thus the pump 58 pumps oil from the rear to the front end of the cylinder 39 and causes the piston to move rearwardly therein, and thereby moving the control rod 26 rearwardly to force the left-hand cultivator 15 into the ground. The implement 15 can be locked in any desired position by returning the control lever 52 to a vertical position in which the valve member 65 once more closes off the cylinder ducts 43, 45 and locks the piston against further movement in either direction.

Inasmuch as the gear type of pump 58 disclosed in this embodiment of my invention is of the positive displacement type and is driven at substantially constant speed by the tractor engine, provision must be made for by-passing the output of the pump at all times when one of the cylinders is not connected to receive the oil therefrom. For this purpose, the opposite end of each of the movable valve members 56 is made cylindrical in form and is provided with a diametrically extending hole 67, serving to by-pass the oil through the case 55. The holes 67 in the two by-pass portions of the valve members 56 are connected in series by means of an interconnecting duct 69. The opposite side of the valve case of valve 50 is connected by means of a branch duct 70 to the return duct 64 leading to the low pressure side of the pump, while the opposite side of the by-pass connection to the other valve 51 is connected by means of a branch duct 71 to the high pressure duct 59 from the pump 58. Thus it is evident that when both of the valve members 56 are disposed in neutral position in which the ducts leading to the cylinders are closed off, the oil from the pump is by-passed from the high pressure duct 59 through the branch 71, through the hole 67 in the valve member 56, through the interconnecting duct 69 to the hole 67 in the other valve, and then through the branch duct 70 back to the return duct 64. Hence, when either of the valves 50 or 51 is set in either raising or lowering position, the series connected by-pass is closed off and therefore permits a high pressure to be built up in the discharge duct 59 of the pump.

While I have described in detail the construction of one of the valves 50, the other valve 51 is of similar construction and operates in a similar manner to control the flow of oil into the front or rear end of the cylinder 40 through the ducts 46, 44, respectively. It is to be noted that when either of the control levers 52, 53 are moved forwardly or rearwardly with respect to the tractor, the associated pistons and piston rods 37, 38 will start to move in the same direction in which the control lever associated therewith was moved. Then when the control lever is returned to a vertical position the piston and piston rod are locked against movement in either direction.

Coming now to that part of the mechanism with which my invention is more particularly concerned, each of the valve operating levers 52, 53 is provided with an actuating element 75, 76, by means of which the associated control lever is returned to neutral position automatically when the piston reaches the end of its travel, and the opposite control lever is moved to initiate a movement of the other piston into a corresponding position. The actuating members 75, 76 comprise a pair of longitudinally extending rods 77, 78 connected at their rear ends to crank pins 79, 80 which are journaled in the ends of the crank arms 35 on the rock shafts 29, 28, respectively. The rods 77, 78 are connected to the pins 79, 80 by means of connecting blocks 81 secured to the pins 79, 80 by bolts 82. Inasmuch as the piston rods 37, 38 are connected through the links 36 to the same crank pins 79, 80, respectively, it is evident that the movement of the actuating rods 77, 78 is parallel to and coincident with the movement of the piston rods. The forward ends of the actuating rods 77, 78 are supported in bearing blocks 83, which are apertured at 84 (see Figure 4) to receive the rods, the latter being freely slidable through the apertures 84. The bearing blocks 83 are mounted on the lower ends of a pair of extensions 85 on the valve control levers 52, 53, respectively. The free sliding relation between the rods and the bearing blocks 83 permits the valve levers 52, 53 to be easily moved relative to the actuating rods 77, 78, respectively.

A pair of collars 86, 87 are mounted on each actuating rod 77, 78 on opposite sides of the bearing block 83 and are rigidly attached to the rods by set screws 88. The collars 87 mounted forward of the bearing blocks 83, are adapted to engage the latter at the end of the rearward stroke of the pistons when the load is being lowered. Engagement of the collars 87 with the bearing blocks 83 forces the latter rearwardly and returns the valve levers 52, 53 to a vertical or neutral position and thereby stopping the rearward movement of the pistons.

Similarly, during the raising stroke of the pistons the collars 86 engage the opposite side of the bearing blocks 83 when the levers 52, 53 are moved forwardly into the position "A" indicated in dotted lines in Figure 4, causing the levers to be returned to a vertical or neutral position at the end of the forward movement of the pistons. Thus, if it is desired to move either of the piston rods 37, 38 through its full stroke in either direction, it is necessary only to place the corresponding valve control lever 52, 53 in its raising or lowering position, and the latter will be returned to a neutral position at the end of such stroke.

The object of the present invention, however, is to not only stop the movement of the one piston rod, but to initiate a movement of the opposite piston rod at the time the first rod reaches the end of its stroke. This is accomplished by means of a pair of actuating members 90, 91 on each of the control rods 77, 78, each of the actuating members 90, 91 comprising a collar 92 embracing the control rod and rotatable thereon. Fixed to each of the collars 92 is an engaging bar 93, which is mounted on an inwardly extending eccentric portion 94 of the collars 92 and extends upwardly therefrom. Inasmuch as the weight of the bar 93 is thus imposed upon the collar 92 eccentric to the axis of rotation upon the control rods 77, 78, the bar 93 tends to swing in a transverse vertical plane toward the opposite side of the power lift device. This movement is limited by means of a stop pin 95 fixed to a collar 96 embracing the control rod on the opposite side of the collar 92, the stop pin 95 engaging a cooperative pin 97 fixed to the eccentric portion 94 of the collar 92. When the engaging bars 93 are inclined, as indicated in Figures 5 and 6, to the position in which the stop pins 95, 97 are in engagement with each other, the upper ends of the bars 93 are disposed in register with the inwardly turned end 100 of a horizontal beam 101 fixed by a bolt 102 to the valve operating levers 52, 53. In other words, each of the valve operating levers 52, 53 is provided with a fore and aft extending beam 101 having inwardly turned ends 100 which are adapted to be engaged by the engaging bars 93, inclined in register therewith from the actuating rods 77, 78 of the opposite hydraulic control mechanism. The length of each of the beams 101 is such that by the time the first actuated control lever 52 (assuming that is the first to be operated), is returned to neutral position by virtue of the collar 86 engaging the sliding block 83, the engaging bar 93 has moved the opposite control lever 53 into its active control position, by engaging the end 100 of the beam 101. This initiates a movement of the piston in the opposite cylinder 40 together with its piston rod 38 and actuating rod 78 until the collar 86 engages the sliding block 83 on the lower end of the lever 53 to return the latter to neutral position.

It is evident, however, that before the second lever 53 can be returned to neutral position, it is necessary to withdraw the bar 93 out of engagement with the end 100 of the beam 101 on the lever 53. To accomplish this purpose means have been provided to retain all of the engaging bars 93 in a substantially vertical position out of register with the ends 100 of the beams 101, whenever the two piston rods are in corresponding positions placing the bars 93 in opposition. To accomplish this purpose, I have provided on each of the engaging bars a ball 105 having a central aperture 106 adapted to receive the cylindrical bar 93 and providing for rotation of the ball 105 about the axis of the bar 93. Each of the balls is retained at the lower end of the bar 93 by a retaining pin 107. Thus, as two opposite engaging bars 93 approach each other in inclined position, the balls of the two bars interengage and swing both bars toward a vertical position. Obviously, this is true, regardless of which bar is ahead of the other, and therefore it is possible for the bar 93 on either side to approach and even pass the corresponding bar on the other side of the mechanism without interference. In order to insure that the bars 93 are both raised through the same angle and are thus held in a central or nearly vertical position between the inwardly turned ends 100 of the beams 101, the stop pins 97 and the collars 92 are extended through the latter and project from the opposite sides thereof. These pin extensions 97' engage stop pins 110, fixed to the collars 86, 87, respectively. Thus, each of the bars 93 can swing through an angle from the inclined position shown in Figure 6 in solid lines to the nearly vertical position, indicated in dotted lines, the two positions being limited by the pins 97 engaging the pins 95 in the inclined position to prevent further swinging movement downwardly, and engaging the pins 110 when the bars 93 swing upwardly and thus prevent further swinging movement in that direction.

The operation of the mechanism will now be described. The parts as shown in Figures 3 and 4 are in lowered position with the pistons moved to the rear of the cylinders, or toward the left as viewed in Figures 3 and 4. The valve operating levers 52, 53 are vertically disposed in neutral position, in which the ducts leading to the cylinders are closed off and the oil is being by-passed through the openings 67 in the cylindrical portions 66 of the valve members 56. Assuming that it is desired to raise first the implements on the left side of the tractor, followed by the implements on the right side of the tractor, the valve lever 52 is pushed forwardly into position "A," thus closing the by-pass duct 70, connecting the high pressure oil duct 59 through the branch 60 with the duct 45 leading to the rear end of the cylinder 39, and connecting the branch 62 of the return duct 64 with the duct 43 leading to the forward end of the cylinder 39. This causes the oil to the pumped from the forward end of the cylinder to the rear end of the cylinder, thus pushing the piston and piston rod 37 forwardly. This also moves the actuating rod 77 forwardly relative to the opposite actuating rod 78 and therefore as soon as the balls 105 are disengaged from each other, both of the actuating bars 93 drop to the oppositely inclined positions shown in solid lines in Figure 6, whereby the bar 93 associated with the actuating rod 77 moves into contact with the end 100 of the beam 101 on the valve lever 53, and continued movement of the rod 77 causes a forward movement of the valve lever 53. The collar 86 also engages the sliding block 83 on the lower end of the valve lever 52 and causes the latter to return to neutral position.

The parts of the mechanism are now in the positions shown in Figures 5 and 6, in which valve lever 53 is in raising position. It is noted that piston rod 37 has moved the crank 35 on the rock shaft 29 into raised position, thus raising the cultivators on the left side of the tractor, whereas piston rod 38 has just begun to move forwardly to swing its associated rock shaft 28 toward raised position.

It will be noted that as rod 78 moves forwardly toward the cylinder 40, the bar 93 on the forward actuating device 91 must be moved toward a vertical position in order to pass the inwardly turned end 100 on the beam 101 of the lever 52. To serve this purpose, a generally spherical camming surface in form of a knob 112 is rigidly attached on the inner side of the inwardly turned ends of each of the beams 101.

The piston in cylinder 40 continues to move forwardly, and when the two pairs of balls or rollers 105 interengage, they cause the engaging bars 93 to swing to a nearly vertical position. The collar 86 engages the bearing block 83, thereby forcing the control lever 53 to swing into a vertical or neutral position and thus bringing the piston in cylinder 40 to rest. The pistons of both cylinders 39, 40 are held in the forward ends of the latter and in this position both of the cultivating implements are locked in raised position.

Although the foregoing description was based on the assumption that the implement on the left side of the tractor was raised first, it will be evident that the implement on the right side of the tractor could have been raised first by swinging the associated control lever 53 forwardly, and in a manner similar to the above described, the collar 86 on the rod 78 would have engaged the side block 83 and the lever 53, and at the same time the engaging bar 93 carried on the rod 78 would have engaged the beam 101 of the left hand control lever 52, and thus resulting in a raising movement of the cylinder 39 at the time the right hand cylinder 40 had completed its stroke.

With both implements in the raised position, either implement can be lowered by swinging its associated control lever 52, 53 rearwardly to initiate a rearward movement of the corresponding piston. Assuming that the left hand implement is to be lowered first, the left hand control lever 52 is swung rearwardly, thus moving the hydraulic control valve 50 into position "B," as indicated in dotted lines in Figure 8. This connects the high pressure branch duct 60 to the cylinder duct 43 leading to the forward end of the cylinder, and also connects the return duct 62 with the cylinder duct 45 leading to the rear end of the cylinder 39. The piston rod 37 and actuating rod 77 then move rearwardly, rocking the crank 35 and rock shaft 29 to lower the implement on the left side of the tractor. The forward engaging rod 93 of the actuating device 91 on the control rod 77 drops into inclined position as soon as the opposed ball rollers 105 are separated and is thus in register with the forward end 100 of the beam 101 fixed to the opposite control lever 53. Engagement with the latter swings the same rearwardly into lowering position and the piston in the right hand cylinder 40 begins to move rearwardly. At the same time, the collar 87 moves into engagement with the sliding block 83 on the lower end of the lever 52, swinging the latter into neutral position and arresting the movement of piston rod 37 at the rear end of its stroke. The piston in cylinder 40 then moves rearwardly, lowering the right hand implement to ground engaging position, and automatically stopping when the collar 87 engages the sliding block 83 on the lower end of the control lever 53, swinging the latter to neutral position. At the same time, the ball rollers of the two sets interengage and support the two pairs of bars 93 in a substantially vertical position. The control mechanism has now returned to the condition shown in Figures 3 and 4.

I do not intend my invention to be limited to the embodiment shown and described herein except as set forth in the claims which follow.

I claim:

1. In a device of the class described, the combination of a pair of power operated movable members, a pair of control elements associated therewith for governing the operation of said members, respectively, and means responsive to the movement of either one of said members, for actuating the control element associated with the other of said members to effect a movement of the latter.

2. In a device of the class described, the combination of a pair of movable members, means for moving each of said members, and means responsive to the arrival of either one of said members at a certain position, for initiating a movement of the other of said members.

3. In a device of the class described, the combination of a pair of movable members, means for moving said members between certain positions, control means responsive to the arrival of either one of said members at a certain position, for stopping the last mentioned member and initiating a movement of the other of said members, and means responsive to the arrival of said other member at a certain position for stopping said member.

4. In a device of the class described, the combination of a pair of movable members, means for moving said members between certain positions, control means responsive to the arrival of either one of said members at a certain position, for stopping the last mentioned member and initiating a movement of the other of said members toward its corresponding position, and control means responsive to the return of either one of said members to its original position for stopping the same and initiating a return movement of the other of said members.

5. In a power lift mechanism, a pair of lifting members, a pair of control elements associated therewith for governing the operation of said members, respectively, and means responsive to the arrival of either one of said members at a certain position, for actuating the control element associated with the other of said members to effect an operation of the latter.

6. In power lift mechanism, a pair of lifting members, a pair of control elements associated therewith for governing the operation of said members, respectively, between certain positions, control means responsive to the arrival of either one of said members at raised position for stopping said member and actuating the control element associated with the other of said members to raise the same, and control means responsive to the arrival of either one of said members at lowered position for stopping said member and actuating the control element associated with the other of said members to lower the same.

7. For use with a tractor having implements mounted in spaced positions thereon, power lift mechanism adapted to receive power from the tractor engine and comprising a pair of lifting members connected with said implements, respectively, for raising and lowering the latter, a pair of control elements for governing the operation of said lifting members, respectively, and means responsive to the movement of either one of said implement connected lifting members into raised position for actuating one of said control elements to stop said one member in raised position and actuate the other of said control elements to operate the other of said lifting members to raised position.

8. For use with an engine driven tractor, the combination of a pair of implements mounted at different locations on the tractor by means providing for movement thereof between operative and inoperative positions, a lifting member associated with each of said implements, an engine driven device for moving said lifting members, control means for operatively connecting each of said lifting members with said device separately for raising the associated implement, and means responsive to the completion of the raising movement of either one of said implements for transferring the connection of said engine driven device to the lifting member associated with the other of said implements.

9. The combination with a motor propelled vehicle, of an implement mounted for vertical movement on one side of the vehicle, a second implement mounted for vertical movement on the other side of the vehicle, a power lift mechanism connected with the motor of the vehicle to be operated thereby, a lifting member connected with the implement at the right side of the vehicle, a second lifting member connected with the implement at the left side of the vehicle, means optionally connecting either of said lifting members with said power lift mechanism to be operated thereby to lift the associated implement, means responsive to the movement of said lifting member to a certain position for disconnecting the same from said power lift mechanism, locking said member in raised position, and connecting the other of said lifting members with said power lift mechanism to be operated thereby to lift the implement on the opposite side of the tractor.

10. The combination with a motor propelled vehicle, of two separate implements mounted at different points on the vehicle for vertical movement relative to the vehicle, a power lift mechanism connected with the motor of the vehicle to be operated thereby, a lifting device connected with one of said implements, a second lifting device connected with the other of said implements, and means for optionally connecting said lifting devices with said lift mechanism to be successively lifted thereby in either order of succession, including means responsive to the lifting of either of said implements to a lifted position for holding the first-raised implement in raised position independent of the continued operation of said lift mechanism and for initiating the lifting of the other of said implements.

11. The combination with a motor propelled vehicle, of two separate implements mounted at different points on the vehicle for vertical movement relative to the vehicle, a power lift mechanism connected with the motor of the vehicle to be operated thereby, a lifting device connected with one of said implements, a second lifting device connected with the other of said implements, control means for optionally connecting said lifting devices with said lift mechanism in either order of succession and for optionally lowering said lifting devices in either order of succession, including means responsive to the lifting of either of said implements to a lifted position for disconnecting the associated lifting device from said lift mechanism and connecting the other of said lifting devices to said mechanism, and means responsive to the moving of either of said implements to a lowered position for initiating the movement of the other of said implements to a lowered position.

12. In power lift mechanism, a pair of lifting members movable between certain raised and lowered positions, power operated means for moving said members, a pair of control elements associated with said lifting members for governing the operation of said members, respectively, and an actuating member attached to each of said lifting members for movement therewith, each of said actuating members being positioned to engage the control element associated with the opposite lifting member at a certain point in the range of lifting movement of said actuating member to initiate a lifting movement of said opposite lifting member.

13. In power lift mechanism, a pair of lifting members movable between certain raised and lowered positions, power operated means for moving said members, a pair of control elements associated with said lifting members for governing the operation of said members, respectively, a stop attached to each of said lifting members for movement therewith into engagement with the control element associated therewith to stop said lifting member at the end of its range of movement, and an actuating member attached to each of said lifting members for movement therewith into engagement with the control element associated with the other lifting member to initiate movement of the latter as the first moved lifting member reaches the end of its range of movement.

14. In power lift mechanism, a pair of lifting members movable between certain raised and lowered positions, power operated means for moving said members, a pair of control elements associated with said lifting members for governing the operation of said members, respectively, an actuating member attached to each of said lifting members for movement therewith into engagement with the control element associated with the other lifting member to initiate movement of the latter as the first moved lifting member reaches the end of its range of movement, and means for moving said actuating members out of engagement with said control members, responsive to movement of the last moved lifting member.

15. In power lift mechanism, a pair of lifting members movable between certain raised and lowered positions, power operated means for moving said members, a pair of control elements associated with said lifting members for governing the operation of said members, respectively, and a pair of actuating members attached to said lifting members, respectively, by means providing for movement relative thereto, and biased toward positions in register with the control elements associated with the opposite lifting members, respectively, said actuating members being opposed when said lifting members are in corresponding positions and having interengaging parts holding said actuating members out of register with said control elements, whereby, upon movement of either one of said lifting members, the associated actuating member engages the control element of the other lifting member, effecting a movement of the latter, whereupon the actuating members are returned to interengaged position out of register with said control elements.

16. In power lift mechanism, a pair of lifting members movable between certain raised and lowered positions, power operated means for moving said members, a pair of control elements associated with said lifting members for governing the operation of said members, respectively, a pair of actuating members swingably attached to said lifting members, respectively, in normally opposed relation when said lifting members are disposed in corresponding positions, and biased for movement toward positions in register with the control elements associated with the opposite lifting members, respectively, and a pair of rollers journaled on said actuating members, respectively, and adapted to interengage when the latter move into opposed relation to force the same into a neutral position out of register with said control elements, whereby, upon movement of either one of said lifting members, the associated actuating member engages the control element of the other lifting member, effecting a movement of the latter, whereupon the actuating members are returned to interengaged position out of register with said control elements.

17. In power lift mechanism, a pair of lifting members including parallel rods reciprocable between certain limits, power operated means for moving said rods, a pair of control elements associated with said lifting members and movable in a direction parallel to the movement of said rods for governing the operation of said members, respectively, a pair of actuating members attached to said rods for movement therewith and in normally opposed relation when said rods are disposed in corresponding positions, and biased for movement toward positions in register with the control elements associated with the opposite lifting members, respectively, and adapted to engage the latter upon completion of a movement of their associated rods to move the control element of the opposite lifting member to effect a movement of the latter, said actuating members having interengageable parts adapted to return said actuating members to a neutral position out of register with said control elements when said actuating members are moved into said normally opposed relation.

18. The combination set forth in claim 17 with the further provision of a second pair of similar actuating members attached to said rods, respectively, on the opposite side of said control elements for engagement with the latter when the lifting elements are moved to the opposite end of their range of reciprocating movement.

19. In power lift mechanism, a pair of lifting members including parallel rods reciprocable between certain limits, power operated means for moving said rods, a pair of control elements associated with said lifting members and movable in a direction parallel to the movement of said rods for governing the operation of said members, respectively, a stop attached to each of said rods for movement therewith into engagement with the control element associated therewith to stop said lifting member at the end of its range of movement, a pair of actuating members attached to said rods for movement therewith and in normally opposed relation when said rods are disposed in corresponding positions, and biased for movement toward positions in register with the control elements associated with the opposite lifting members, respectively, and adapted to engage the latter upon completion of a movement of their associated rods to move the control element of the opposite lifting member to effect a movement of the latter, said actuating members having interengageable parts adapted to return said actuating members to a neutral position out of register with said control elements when said actuating members are moved into said normally opposed relation.

20. The combination set forth in claim 19 with the further provision of a second pair of similar stops and a second pair of similar actuating members attached to said rods on the opposite side of said control elements for engagement with the latter when the lifting elements are moved to the opposite end of their range of reciprocating movement.

21. A hydraulic mechanism comprising a pair of fluid actuated members, means for supplying fluid under pressure thereto and for directing said fluid to either of said members, selectively, to actuate the latter, and means controlled by movement of said actuated member for subsequently directing fluid under pressure to the other of said members to actuate the latter.

22. A hydraulic mechanism comprising a pair of fluid actuated members adapted for reciprocative movement, means for supplying fluid under pressure thereto and for directing said fluid to move either of said members, selectively, in either direction, and means controlled by movement of said actuated member for subsequently directing fluid under pressure to move the other of said members in the same direction.

THEOPHILUS BROWN.